Sept. 13, 1960 R. HINTZE 2,952,400
MOTOR-COMPRESSOR
Filed Aug. 5, 1957 2 Sheets-Sheet 1

INVENTOR.
Rudolf Hintze
BY Michael S. Striker
ATTORNEY

Sept. 13, 1960 R. HINTZE 2,952,400
MOTOR-COMPRESSOR
Filed Aug. 5, 1957 2 Sheets-Sheet 2
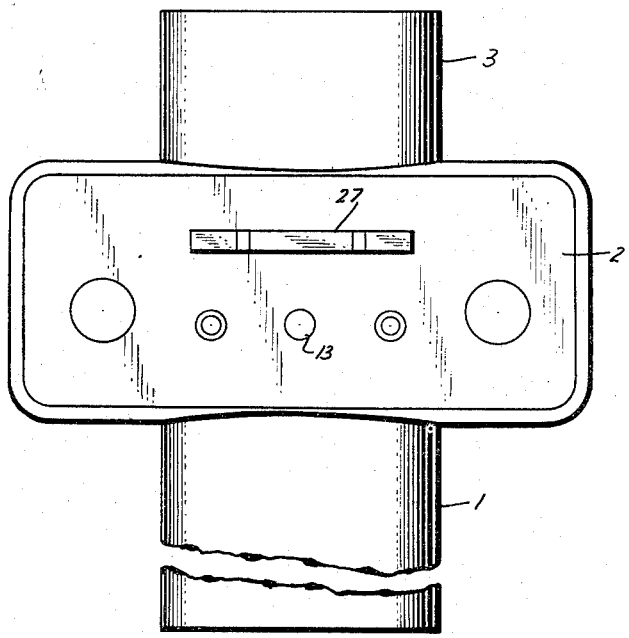
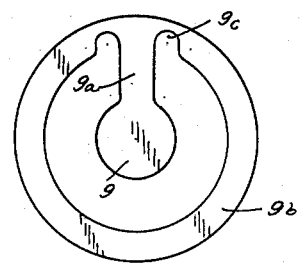
INVENTOR.
Rudolf Hintze
BY Michael S. Striker
ATTORNEY United States Patent Office 2,952,400
Patented Sept. 13, 1960

2,952,400
MOTOR-COMPRESSOR

Rudolf Hintze, Neuenhain (Taunus), Germany

Filed Aug. 5, 1957, Ser. No. 676,251

Claims priority, application Germany Jan. 15, 1955

9 Claims. (Cl. 230—58)

The present invention relates to motor-compressors.

More particularly the present invention relates to motor-compressors of the type which are used in household refrigerators, for example, such units being hermetically sealed.

This application is a continuation-in-part of my copending application Serial No. 558,794, filed January 12, 1956, and entitled "Motor-Compressor," now Patent No. 2,883,099, dated April 21, 1959.

The present invention relates to further improvements of motor-compressors of the type disclosed in the above application. With such motor-compressors not only is there a common carrier for both the motor and the compressor, but in addition extreme compactness is highly desirable.

One of the objects of the present invention is to provide a motor-compressor of the above type wherein the suction passage does not extend beyond the end of the cylinder, as is the case in the above application.

Another object of the present invention is to provide a motor-compressor of the above type with an improved suction valve which is of an exceedingly simple construction, which is very reliable in operation, and which is capable of being used in existing motor-compressors without any special arrangement required for the reception of the suction valve.

A further object of the present invention is to provide a motor-compressor of the above type with means for fixing the end wall of the cylinder to the remainder of the cylinder in a simple efficient manner and suitable for the particular material of which the cylinder is made. For example, a suitable means is provided if the cylinder is made of a brittle material such as cast iron, and also a suitable fixing means is provided if the cylinder is made of steel or other relatively ductile materials.

An additional object of the present invention is to provide a structure capable of accomplishing all of the above objects and at the same time composed of simple and ruggedly constructed elements which are very reliable in operation, and which are capable of being easily manufactured with a minimum possibility of damaging the parts.

With the above objects in view the present includes the following features:

A motor-compressor of which the present invention forms a part includes a wall means which forms part of a carrier of the motor compressor and this carrier carries both the motor of the motor-compressor and the compressor thereof. This wall means defines a suction chamber and a pressure chamber separate from and located adjacent to the suction chamber. A cylinder means forms part of the compressor of the motor-compressor, and this cylinder means is closed at one of its ends and has a side surface adjacent its closed end directed toward but spaced from the wall means. A block means is located between the wall means and the cylinder means and fixes the cylinder means at its side surface which is adjacent its closed end to the wall means. A suction passage means is formed in the block means and in the end of the cylinder means and leads from the suction chamber through the block means and the end of the cylinder means into the interior of the latter. A pressure passage means leads from the cylinder means at a part thereof forwardly of but adjacent its closed end through a side wall portion of the cylinder means and through the block means to the pressure chamber. Finally a pair of valve means respectively cooperate with the pair of passage means to compel fluid to enter into the cylinder means from the suction chamber during suction strokes of a piston in the cylinder means and for compelling the fluid within the cylinder means to discharge therefrom through the pressure passage during pressure strokes of the piston in said cylinder means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 6 is a diagrammatic fragmentary plan view showing the structure as seen when looking toward part of a block means which fixes a cylinder of the invention to a carrier, Fig. 6 in particular showing the shape of an opening which forms part of a suction passage of the structure of the invention; and Figure 7 is a plan view of a valve constructed according to the present invention.

Figure 1:
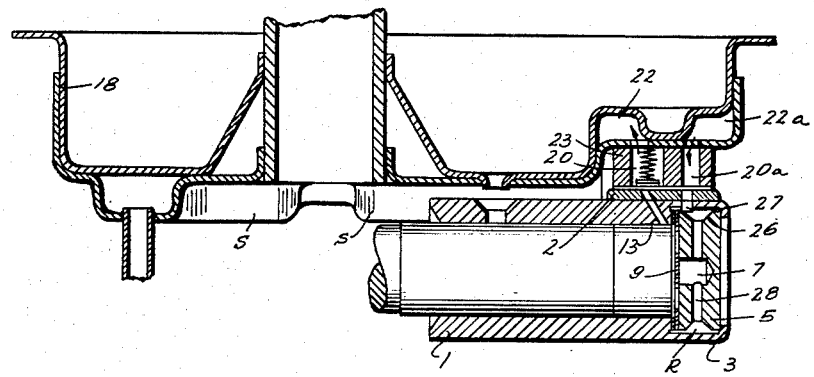
Figure 1 is a fragmentary sectional elevational partly diagrammatic view of part of a motor-compressor according to the present invention, the structure shown in Fig. 1 including the improvements of the present invention.

Referring now to Fig. 1 of the drawings, there is illustrated therein a carrier 18 which serves to carry both the motor and the compressor of the motor-compressor of the present invention. Fig. 1 fragmentarily illustrates the bearing sleeve for the shaft of the motor which extends downwardly beyond the carrier 18 and which is connected through a suitable crank with the piston fragmentarily shown in Fig. 1 within the cylinder 1 which is illustrated in section. The carrier 18 is provided at its bottom end, as viewed in Fig. 1, with a wall means composed of a plurality of wall members which are connected together so as to form the noise-reducing chambers S as well as the pair of chambers 22 and 22a shown at the right of Fig. 1. The chamber 22a is a suction chamber and a chamber 22 is a pressure chamber and these chambers communicate with the noise-reducing chambers S in a manner not illustrated in the drawing for the sake of clarity. In the direction of fluid flow the suction chamber 22a of the wall means is located ahead of and the pressure chamber 22 of the wall means is located behind the noise-reducing chambers S.

The cylinder means of the compressor is composed of the elongated hollow cylinder 1 which has an end portion 3 of a lesser wall thickness than the remainder of the cylinder 1 and connected thereto by an inner annular shoulder 4 which is directed toward the extremity of the end portion 3 of the cylinder. A block means serves to connect the cylinder 1 with the carrier 18 and this block means includes a member 2 fixed directly to an outer side surface of the cylinder 1 adjacent the end portion 3 thereof and a block 23 fixed to the member 2 as well as to the wall means so as to connect the right end portion of the cylinder 1, as viewed in Fig. 1, to the portion of the wall means which defines the chambers 22 and 22a.

The end portion 3 of the cylinder 1 has located within its interior an end wall means formed in the embodiment of Fig. 1 by an end wall member 5 which is located within and surrounded by the end portion 3 and which is urged toward the shoulder 4 by the inwardly curved extremity of the end portion 3 of the cylinder 1. This extremity is curved inwardly to form an inwardly extending annular flange pressing against the right face of the end wall member 5 so as to urge the latter toward the shoulder 4.

The end wall member 5 is formed with an annular groove 26 of substantially trapezoidal configuration, and this annular groove 26 defines with the end portion 3 of this cylinder 1 an annular space R which forms part of a suction passage through which fluid flows to the interior of the cylinder 1, this fluid being in the form of a refrigerant in vapor form as used in a household refrigerator, for example. The end wall member 5 is also formed with a plurality of radial bores 28 which extend from the groove 26 to the axis of the cylinder and which communicate with an axial passage 7 of the end wall member 5, this passage 7 extending from the left face of member 5 toward but short of the right face thereof, as viewed in Fig. 1. The cylinder 1 is formed at its end portion 3 with a cutout 27 which also is formed in the member 2, and this cutout 27 communicates with an opening 20a formed in and passing through the block 23. Thus, the openings 20a and 27 form part of a suction means which is located in the block means 2, 23 as well as in the cylinder 1. The suction passage means 20a, 27, R, 28, 7 extends from the suction chamber 22a to the interior of the cylinder 1 so as to guide fluid from the chamber 22a to the interior of the cylinder 1. A valve means 9 which is described in greater detail below cooperates with the end of the axial passage 7 which is directed toward the interior of the cylinder 1 for permitting the fluid to flow into the cylinder 1 from the suction passage means but preventing the fluid from flowing in the reverse direction. Between the valve 9 and the shoulder 4 is located a suitable sealing ring which is clamped between the shoulder 4 and the valve 9, the latter and the end wall member 5 being pressed against each other by the inwardly directed annular flange at the extremity of the end portion 3 of the cylinder 1.

A pressure passage means is also provided for guiding fluid from the interior of the cylinder 1 during pressure strokes of the piston therein, fluid flowing into the cylinder during suction strokes of this piston. This pressure passage means includes the elongated bore 13 formed in the side wall of the cylinder 1 forwardly of but adjacent the shoulder 4 thereof, and this bore 13 extends through the member 2 of the block means into communication with a bore 20 formed in the block 23 and passing therethrough and forming part of the pressure passage means. This bore 20 communicates with an opening in the carrier 18 with the pressure chamber 22, in much the same way that the opening 20a of the block 23 communicates through a similar opening with the suction chamber 22a. Thus, the pressure passage means 13, 20 provides a path for the fluid from the interior of the cylinder 1 to the pressure chamber 22 of the wall means of the carrier 18. Within the cutout 20 of the block 23 is located a spring-pressed non-return valve which cooperates with the top end of the bore 13 so as to permit the fluid to flow into the cutout 20 while preventing the reverse direction of flow.

It will be noted that with this structure the suction chamber which corresponds to the chamber 22a is not located at the right end of the cylinder 1, as was the case in the above-identified application, so that the structure of the present invention is more compact and requires less space. Also, the wall means of the carrier 18 defines the noise-reducing chambers S so that special elements forming such noise-reducing chambers are not required.

The common opening 27 of the cylinder 1 and the part 2 of the block means is shown in detail in the enlarged illustration of Fig. 6. As is apparent from Fig. 6 this cutout 27 is relatively long and narrow and it is formed with a thin saw-blade which simply cuts through both the element 2 and the cylinder 1 in order to form the elongated cutout 27 which communicates with the elongated opening 20a of the block 23, the opening 20 being similarly elongated. It is of considerable advantage to saw the cutout 27 since there is no undesirable pressure on the parts which will cause unnecessary and undesired deformation thereof. This is in contrast to forming an opening corresponding to the opening 27 by drilling holes or the like, because with such drilling considerable pressure is applied and the parts can easily become undesirably deformed.

With the above described structure of Fig. 1 the elements 2, 23, 1 and 18 may be welded to each other, for example, in order to become connected together, or, as is indicated in Fig. 6 suitable openings for screw members or the like may be provided in the member 2 for fixing the latter to the block 23.

Figure 2:
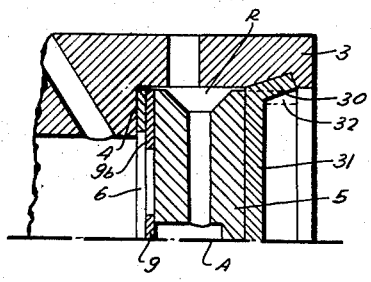
Figure 2 is a fragmentary sectional view taken in a plane which includes the axis of a cylinder of the structure of the invention and showing one possible embodiment of a structure for connecting an end wall of the cylinder to the remainder thereof.

With the above described structure of Fig. 1 it is necessary to bend the end of the portion 3 of the cylinder 1 inwardly in order to fix the end wall 5 in position, this inwardly curved flange of the cylinder 1 forming a means for fixing the end wall 5 in position with respect to the shoulder 4. Thus, it is not possible to use in the embodiment of Fig. 1 a brittle material such as a cylinder made of cast iron. Fig. 2 shows an embodiment where such a material may be used.

Thus, referring to Fig. 2 it will be seen that the end portion 3 of the cylinder 1 is not curved inwardly at its right extremity but is instead formed with an inner groove 30 of substantially triangluar cross-section. The end wall 5 is held in place in this embodiment by a cover member 31 which engages the right face of the end wall, as viewed in Fig. 2, and which has at its outer periphery an annular flange directed to the right from the remainder of the cover 31, as viewed in Fig. 2. In its original position this flange 32 has the dotted line position indicated in Fig. 2. When the parts are assembled a suitable tool is applied to the flange so as to expand the same outwardly into the groove 30 so that the flange of the cover 31 then assumes the position indicated in solid lines in Fig. 2, and in this position the groove cooperates with the flange 32 to maintain the cover 31 in position pressing against the end wall member 5 and maintaining the latter in engagement with the valve 9 as well as the sealing ring 6 clamped between the shoulder 4 and the valve member 9.

Figure 3:
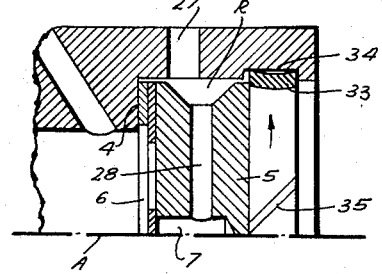
Figure 3 is a sectional elevational view taken in a plane which includes the axis of the cylinder and showing fragmentarily another embodiment of a structure for fixing an end wall of the cylinder to the latter.

A further possibility for using a cylinder made of a relatively brittle material is shown in Fig. 3 where the end portion 3 of the cylinder 1 is formed adjacent its extremity with an inner annular groove 34 of substantially rectangular cross-section. In this case the end wall member 5 is held in position by a special snap ring 33 which is located within the groove 34. This snap ring 33 has a break in its continuity shown at 35 so that the snap ring is capable of expanding and contracting. In accordance with the present invention the snap ring 33 has an outer annular surface which is concave and an inner annular surface which is curved in the same direction as the outer surface so as to be convex, as shown in Fig. 3. When this ring is introduced into the end portion 3 of the cylinder 1 its diameter is smaller than the diameter thereof in the final assembled position of the parts, and when the snap ring enters into the groove 34 its diameter expands and as a result the curvature of the cross-section of the ring diminishes and tends to flatten out so that the outer surface of the ring becomes less concave. As a result the axial length of the ring tends to increase and the ring presses against the end wall member 5 so as to urge the latter to the left, as viewed in Fig. 3, and thus hold the end wall efficiently in position, as well as the valve member 9 and the sealing ring 6. The depth of the groove 34 is about half the thickness of the ring 33 so that when the latter expands into the groove 34 a considerable portion of the thickness thereof extends inwardly beyond the groove 34 to engage the right end face of the end wall member 5, as viewed in Fig. 3. It will be noted that the groove 34 slightly overlaps the end wall member 5 so that the snap ring 33 bears directly against the right end face of the end wall member 5.

Figure 4:
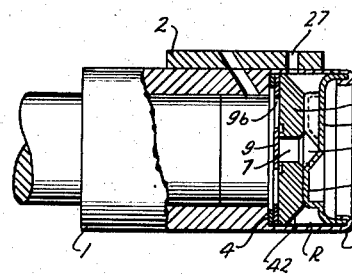
Figure 4 is a fragmentary partly sectional view showing in elevation another embodiment of a cylinder and end wall according to the present invention, the plane of the section of Fig. 4 being taken along the axis of the cylinder.

Except for the above described features of Figs. 2 and 3 these embodiments are identical with that of Fig. 1.

Where the cylinder 1 is made of a more ductile material such as steel, for example, the embodiment of Fig. 4 may be used. According to this embodiment the extremity of the end portion 3 of the cylinder 1 is bent around a free edge of a part of the end wall means. With this embodiment the end wall means includes the inner end wall member 5 which is of a frustoconical configuration so as to be provided with the outer tapered surface 42, and in this embodiment the bore 7 extends axially completely through the inner end wall member 5, this member bearing directly against the valve member 9 which in turn engages the sealing ring 6 which is located against the shoulder 4. The end wall means of Fig. 4 includes in addition to the inner end wall member 5 an outer end wall member 40 made of sheet metal and provided with a plurality of the depressions 41 which directly engage the right face of the inner end wall member 5. For example, there may be three such depressions 41 which are separated from each other by the radial spaces 43 which form the equivalent of grooves extending from the outer portion of the depressions at the inner face of the end wall member 40 to the axis of the cylinder 1. It will be noted that the member 40 extends outwardly beyond its depressions 41 into engagement with the inner surface of the end wall portion free of the cylinder 1 so as to terminate in a substantially cylindrical lip which is surrounded by the inwardly bent portion of the extremity of the end portion 3 of the cylinder 1, and this provides a perfectly fluid tight means for fixing the end wall means 5, 40 within the end portion 3 of the cylinder 1. It will be noted that the surface 42 of the inner end wall member 5 of Fig. 4 together with the outer end wall member 40 define with the end portion 3 of the cylinder the annular space R which forms part of the suction passage and which communicates with the cutout 27 and through the spaces 43 between the depressions 41 with the axial bore 7.

The embodiment of Fig. 4 is relatively inexpensive because of its simplicity and ease of manufacture. For example, the outer end wall member 40 may simply be stamped from sheet metal and the inner end wall member 5 can be die cast or forged in a very inexpensive manner.

Figure 5:
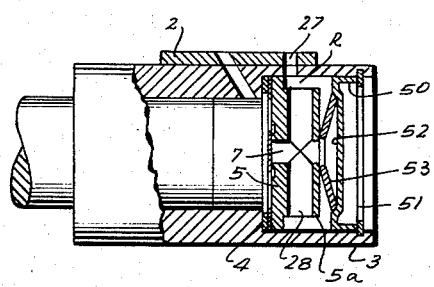
Figure 5 is a partly sectional elevational view showing another embodiment of the structure at the end of a cylinder according to the present invention, the section of Fig. 5 also being taken along the axis of the cylinder.

Fig. 5 illustrates an embodiment of the invention suitable for either brittle or ductile materials forming the cylinder 1. Referring to Fig. 5 it will be seen that the end portion 3 of the cylinder 1 in this embodiment is formed with an annular groove adjacent its right extremity, and a snap ring 51 is received in this groove. With this embodiment the element 5 forms an inner end wall member and this element 5 is formed as its left end, as viewed in Fig. 5, with an outwardly directed annular flange which directly engages the inner surface of the end portion 3 of the cylinder 1. The remainder of the inner end wall member 5 is of a smaller diameter than the interior of the end portion 3 of the cylinder 1 so as to define with this end portion the annular space R which communicates with the elongated cutout 27 to form part of the suction passage means. This inner end wall member 5 is formed with the radial bores 28 as well as the axial bore 7 so as to guide fluid through the interior of the cylinder 1 in the manner described above. The structure of Fig. 5 also includes an outer end wall member 52, and this outer end wall member 52 has an outer peripheral flange 50 which extends up to and engages the snap ring 51 which serves to maintain the outer end wall member 52 in position. This outer end wall member engages the larger end of a dished spring 53 whose smaller end presses against the right end face of the inner end wall member 5, as viewed in Fig. 5, and in this way all of the parts are held in position with the spring means 53 urging the end wall members 5 and 52 away from each other and respectively into engagement with the valve member and the snap ring 51. The outer end wall member 52 is formed at its face which is directed toward the inner end wall member 5 with a recess which receives the outer periphery of the dished spring 53, as is illustrated in Fig. 5. It is apparent that the embodiment of Fig. 5 operates in the same way as the above described embodiments and at the same time is easy and inexpensive to manufacture and assemble.

In accordance with the present invention the suction valve means is also improved, and the improvement resides primarily in providing a different type of valve member which is illustrated in detail in Fig. 7. The suction valve of the present invention includes a ring 9b made of sheet metal or the like and located in the assembly between the end wall means and the sealing ring 6. An extension 9a extends radially from the ring 9b toward the center thereof and this extension 9a terminates in an enlarged circular end portion 9 having its center coinciding with the axis of the cylinder and being large enough to more than cover the end of the bore 7 which is directed toward and located nearest to the interior of the cylinder 1. The entire valve of Fig. 7 is made of a single sheet of springy metal, and it will be noted that the inner periphery of the ring 9b is formed with a pair of cutouts 9c respectively located at opposite sides of the extension 9a and extending from the inner periphery of the ring 9b through a substantial distance towards the outer periphery of the ring so as to increase the length of the extension 9a. These cutouts 9c prevent the formation of fine cracks in the valve during hardening thereof. It is apparent that the valve of Fig. 7 can be inserted without any special precautions into the assembly and the portion 9 will become located precisely in the desired position with the springy extension 9a permitting the desired movement of the valve member 9. Moreover the exceedingly simple and efficient valve of Fig. 7 can be used without any special steps in existing motor-compressor assemblies.

It will be understood that each of the elements described above, or two or more together, may also find a useful application in other types of motor-compressors differing from the types described above.

While the invention has been illustrated and described as embodied in a motor-compressor unit for refrigerators and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motor-compressor in combination, wall means forming part of a carrier which carries a motor and a compressor, said wall means defining a suction chamber and a pressure chamber separate from and located adjacent said suction chamber; cylinder means forming part of a compressor of the motor-compressor, said cylinder means being closed at one end and having a side surface adjacent said one end thereof directed toward but spaced from said wall means; a piston reciprocable in said cylinder means to perform suction and pressure strokes; block means located between said wall means and cylinder means and fixing said cylinder means at said side surface thereof to said wall means; suction passage means formed in said block means and in said one end of said cylinder means and leading from said suction chamber through said block means and said one end of said cylinder means into the interior of said cylinder means; pressure passage means leading from said cylinder means at a part thereof forwardly of but adjacent said one end through a side wall portion of said cylinder means and through said block means to said pressure chamber; and a pair of valve means respectively cooperating with said pair of passage means for compelling fluid to enter said cylinder means from said suction chamber during a suction stroke of a piston in said cylinder means and for compelling the fluid in the cylinder means during pressure strokes of the piston therein to flow from the interior of said cylinder means through said pressure passage means to said pressure chamber.

2. In a motor-compressor as recited in claim 1, said cylinder means including an elongated hollow cylindrical member open at both ends and having at said one end of said cylinder means a wall thickness less than the remainder of said cylinder and joined to the remainder of said cylinder by an annular shoulder in the interior of said cylinder directed toward said one end of said cylinder means, and an end wall means located in and surrounded by said wall portion of lesser thickness of said cylinder and defining with said wall portion an annular space which forms part of said suction passage means.

3. For use in a motor-compressor, in combination, an elongated hollow cylinder having one end portion of a lesser wall thickness than the remainder of said cylinder and joined thereto by an inner annular shoulder directed toward the extremity of said one end portion of said cylinder, said one end portion of said cylinder being formed adjacent its extremity with an annular groove spaced from said shoulder; end wall means located within and surrounded by said one end portion of said cylinder and defining with the latter an annular space forming part of a suction passage for a fluid flowing through the interior of said cylinder, said end wall means being located between said shoulder and said groove and being additionally formed with at least one radial passage leading from said annular space to the axis of said cylinder and an axial passage leading from said radial passage to the interior of said cylinder; valve means cooperating with the end of said axial passage directed toward the interior of said cylinder for permitting fluid to flow through said axial passage into said cylinder preventing the flow of fluid in the reverse direction; and a snap ring located in said groove and cooperating with said end wall means for maintaining the latter in said end portion of said cylinder.

4. For use in a motor-compressor, in combination, an elongated hollow cylinder having one end portion of a lesser wall thickness than the remainder of said cylinder and joined thereto by an inner annular shoulder directed toward the extremity of said one end portion of said cylinder, said one end portion of said cylinder being formed adjacent its extremity with an annular groove spaced from said shoulder; end wall means located within and surrounded by said one end portion of said cylinder and defining with the latter an annular space forming part of a suction passage for a fluid flowing through the interior of said cylinder, said end wall means being located between said shoulder and said groove and being additionally formed with at least one radial passage leading from said annular space to the axis of said cylinder and an axial passage leading from said radial passage to the interior of said cylinder; valve means cooperating with the end of said axial passage directed toward the interior of said cylinder for permitting fluid to flow through said axial passage into said cylinder preventing the flow of fluid in the reverse direction; and a snap ring located in said groove and cooperating with said end wall means for maintaining the latter in said end portion of said cylinder, said snap ring being of substantially rectangular cross-section but having an outer concave face and an inner convex face and said groove being of substantially rectangular cross-section and of lesser thickness than said snap ring, whereby when said snap ring moves into said groove the curvature of the cross-section of said snap ring diminishes during the increase of the diameter thereof while it enters into said groove so that the axial length of said snap ring tends to increase and said snap ring presses said end wall means toward said shoulder.

5. For use in a motor-compressor, in combination, an elongated hollow cylinder having one end portion of a lesser wall thickness than the remainder of said cylinder and joined thereto by an inner annular shoulder directed toward the extremity of said one end portion of said cylinder, said one end portion of said cylinder being formed adjacent its extremity with an annular groove spaced from said shoulder; end wall means located within and surrounded by said one end portion of said cylinder and defining with the latter an annular space forming part of a suction passage for a fluid flowing through the interior of said cylinder, said end wall means being located between said shoulder and said groove and being additionally formed with at least one radial passage leading from said annular space to the axis of said cylinder and an axial passage leading from said radial passage to the interior of said cylinder; valve means cooperating with the end of said axial passage directed toward the interior of said cylinder for permitting fluid to flow through said axial passage into said cylinder preventing the flow of fluid in the reverse direction; and a cover member engaging said end wall means at an end surface thereof directed away from said shoulder and having an outer flange also directed away from said end wall means and extending into said groove, being of a substantially triangular cross-section and engaging the free edge of said cover member which is most distant from said end wall means for cooperating with said end wall means and cover member to maintain said end wall means in said end portion of said cylinder.

6. For use in a motor-compressor, in combination, an elongated hollow cylinder having one end portion of a lesser wall thickness than the remainder of said cylinder and joined to the remainder of said cylinder by an inner annular shoulder of said cylinder which is directed toward the extremity of one said end portion thereof; end wall means located within and surrounded by one end portion of said cylinder, said end wall means including an inner end wall member of substantially frusto-conical configuration formed with an axial bore and having its end face of larger diameter directed toward the interior of said cylinder and said end wall means including an outer end wall member made of sheet metal and having a plurality of depressions engaging the face of said inner end wall member which is directed away from the interior of said cylinder and defining between themselves radial grooves, said depressions having an outer diameter smaller than the maximum diameter of said inner end wall member and said outer end wall member terminating distant from said inner end wall member in a free cylindrical portion engaging the inner surface of said one end portion of said cylinder, so that said end wall members cooperate to define with said one end portion of said cylinder an annular space which communicates through the spaces between said depressions of said outer end wall member with the axial bore of said inner end wall member, said one end portion of said cylinder being curved around the extremity of said outer end wall member to fix the latter together with said end wall member in the interior of said one end portion of said cylinder; and a valve means cooperating with the end of said bore of said inner end wall member which is directed toward the interior of said cylinder for permitting a fluid to flow from said annular space and through said bore into said cylinder by preventing the flow of fluid in the reverse direction.

7. For use in a motor-compressor, in combination, an elongated hollow cylinder having one end portion of a lesser wall thickness than the remainder of said cylinder and joined to the remainder of said cylinder by an inner shoulder of said cylinder which is directed toward the extremity of said one end portion thereof; said one end portion of said cylinder being formed with an inner annular groove spaced from said shoulder; an inner end wall member located within and surrounded by said end portion of said cylinder adjacent said shoulder thereof and having adjacent said shoulder an outwardly directed flange which engages the inner surface of said one end portion of said cylinder, said inner end wall member having beyond said flange a smaller outer diameter than the inner diameter of said one end portion of said cylinder and said inner end wall member being formed with an axial bore passing therethrough as well as at least one radial bore extending from said axial bore to the outer periphery of said inner end wall member and located beyond said flange thereof; an outer end wall member located within and surrounded by said one end portion of said cylinder adjacent said groove; a snap ring in said groove engaging said outer end wall member; spring means between said inner and outer end wall members urging the same apart from each other; and valve means cooperating with the end of said axial bore of said inner end wall member which is directed toward the interior of said cylinder for permitting fluid to flow from the space between said inner end wall member and said one end portion of said cylinder through said radial bore of said inner end wall member to said axial bore thereof and from the latter into the interior of said cylinder preventing the flow of fluid in the reverse direction.

8. In a motor-compressor as recited in claim 7, said outer end wall member being made of sheet metal and having an inner recess directed toward said inner end wall member and said spring means being in the form of a dished spring member of substantially frusto-conical configuration having an outer peripheral portion located in said recess of said outer end wall member and an inner peripheral portion engaging said inner end wall member.

9. In a motor-compressor, in combination, an elongated hollow cylinder having one end portion of a lesser wall thickness than the remainder of said cylinder and joined thereto by an inner annular shoulder directed toward an extremity of said one end portion of said cylinder; end wall means located within and surrounded by said one end portion of said cylinder and defining with said one end portion of said cylinder an annular space which forms part of a suction passage for fluid entering into the interior of said cylinder, said end wall means being also formed with at least one radial passage leading from said annular space to the axis of said cylinder and with an axial passage leading from said radial passage to the interior of said cylinder; valve means cooperating with the end of said axial passage of said end wall means which is directed toward the interior of said cylinder for permitting fluid to flow through said axial passage to the interior of said cylinder by preventing the flow of fluid in the reverse direction; means at said end portion of said cylinder for fixing said end wall means therein; block means fixed to a side surface portion of said cylinder and at least partly overlapping said one end portion thereof, said block means being formed with a pair of openings, passing therethrough, one of said openings being a suction opening and the other of said openings being a pressure opening, said suction opening being located in alignment with said one end portion of said cylinder, said block means and said one end portion of said cylinder being formed with a common elongated narrow slit which communicates with said annular space and with said suction opening and said cylinder being formed forwardly of said shoulder thereof with a passage providing communication between the interior of said cylinder and the pressure opening of said block means; a suction valve means cooperating with the axial passage of said end wall means for permitting the fluid to flow through said axial passage into said cylinder by preventing the flow of fluid in the reverse direction; a pressure valve means cooperating with the pressure opening of said block means for permitting the fluid to flow out of said cylinder by preventing fluid from flowing in the reverse direction; and wall means fixed to said block means and defining a pressure chamber communicating with said pressure opening and a suction chamber communicating with said suction opening.

References Cited in the file of this patent

UNITED STATES PATENTS

| | | |
|---|---|---|
| 1,719,572 | Stoll | July 2, 1929 |
| 1,814,189 | Rocciola | July 14, 1931 |
| 1,874,752 | Hirsch | Aug. 30, 1932 |
| 1,945,338 | Terry | Jan. 30, 1934 |
| 2,000,883 | Cullen et al. | May 7, 1935 |
| 2,027,137 | Yeomans | Jan. 7, 1936 |
| 2,118,356 | Money | May 24, 1938 |
| 2,139,313 | Neubauer | Dec. 6, 1938 |
| 2,327,269 | Jessup | Aug. 17, 1943 |